May 24, 1960
R. E. SMITH
2,937,731
SELF-TIGHTENING DENTAL OVERRUNNING CLUTCH TRANSMISSION
Filed Jan. 6, 1958
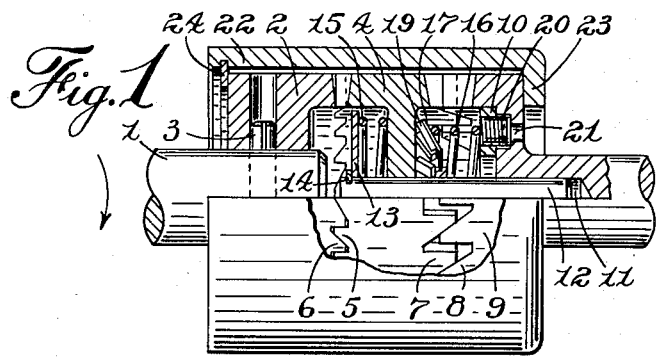
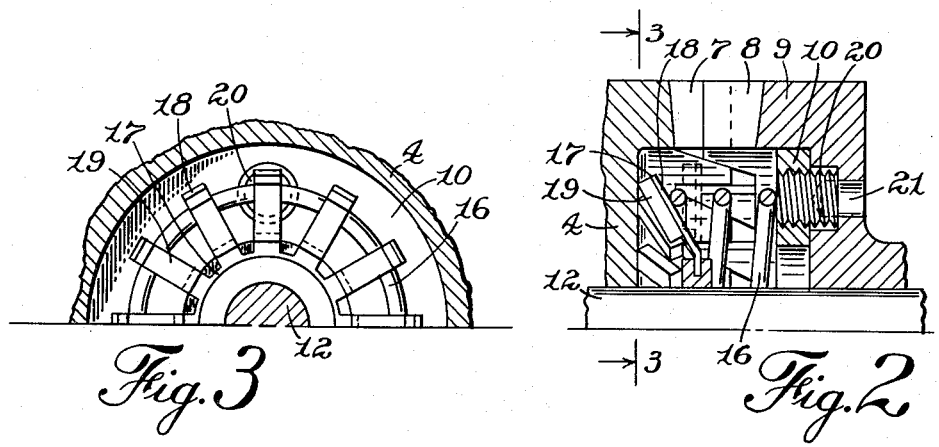
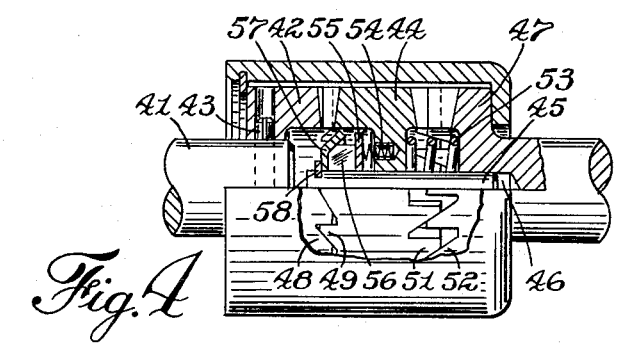
WITNESS:
Esther M. Stockton.
INVENTOR.
Richard E. Smith
BY
Clinton L. James
ATTORNEY United States Patent Office 2,937,731
Patented May 24, 1960

2,937,731
SELF-TIGHTENING DENTAL OVERRUNNING CLUTCH TRANSMISSION

Richard E. Smith, Elmira, N.Y., assignor to Bendix Aviation Corporation, Elmira Heights, N.Y., a corporation of Delaware Filed Jan. 6, 1958, Ser. No. 707,398

6 Claims. (Cl. 192—104)

The present invention relates to a self-tightening dental overrunning clutch transmission, and more particularly such a transmission incorporating centrifugal means for separating the clutch members during overrun, such as shown in the application of Miller Ser. No. 665,231, filed June 12, 1957, and assigned to the assignee of the present application.

It is an object of the present invention to provide a novel device of this type in which the members of the overrunning clutch are not separated by the centrifugal means directly, but by spring means which are rendered operative by the centrifugal means, thereby permitting a lower setting of the centrifugal means.

It is another object to provide such a device which is efficient and quiet in operation and simple and economical in construction.

It is another object to provide such a device which is particularly well adapted for use to start a prime mover such as a gas turbine.

Further objects and advantages will be apparent from the following description taken in connection with the accompanying drawing in which:

Fig. 1 is a side elevation partly broken away and in section showing a preferred embodiment of the invention with the parts in driving relation;

Fig. 2 is an enlarged detail in section of the clutch closing means and the centrifugal controlling elements;

Fig. 3 is a section taken substantially on the line 3—3 of Fig. 2; and

Fig. 4 is a view similar to Fig. 1 showing a second embodiment of the invention.

In Fig. 1 of the drawing there is illustrated a power shaft 1 arranged to be operated by any suitable form of motor, having a driving overrunning clutch member 2 fixedly mounted thereon as by means of a pin 3. An intermediate clutch and coupling member 4 is mounted in alinement with the driving clutch member 2 and is formed with overrunning clutch teeth 5 adapted to cooperate with similar teeth 6 on the driving clutch member. The intermediate coupling member is formed with inclined driving projections 7 meshing with similar projections 8 on a driven coupling member 9. The driven coupling member is counterbored as shown at 11 to receive a sub shaft 12 which forms a bearing support for the intermediate coupling member 4.

A thrust washer 13 is located on the end of the stub shaft 12 by means of a lock ring 14, and a compression spring 15 between said thrust washer and the intermediate coupling member 4 tends to move said coupling member away from the driving clutch member 2 and thereby disengage the overrunning clutch teeth 5, 6. Said clutch teeth are normally held in engagement however by a spring 16 which bears at one end against a thrust ring 10 located in a recess in the driven coupling member 9, and at its other end against an elastic spider 17 fixedly mounted in any suitable manner on the stub shaft 12. Spider 17 has axially inclined arms 18 (Fig. 2) on which for low speed installations weight members 19 may be fixedly mounted in any suitable manner. Arms 18 bear at their ends against the intermediate member 4 under the pressure of the spring 16.

The elastic spider constitutes means for compressing the spring 16 to relieve its pressure on the overrunning clutch when the transmission is rotating above a predetermined speed. In order to select the desired speed at which this takes place, the thrust ring 10 is preferably spaced from the driven coupling member 9 by means of a plurality of adjustment screws 20 seated in counterbores in the coupling member 9 and threaded into the thrust ring 10. The screws 20 are formed with wrench sockets or the like which are accessible for adjustment from the exterior of the transmission through openings 21.

A barrel member 22, arranged to surround and enclose the entire transmission, is formed with a terminal flange 23 at one end and provided with a lock ring 24 in the other end to limit the axial separation of the members of the transmission.

In operation, with the parts in the positions illustrated in Fig. 1, rotation of the power shaft 1 in the direction of the arrow is transmitted through the driving clutch member 2 to the intermediate member 4, and from thence to the driven coupling member 9, the longitudinal reaction of the engagement of the inclined teeth 7, 8 serving to wedge the overrunning clutch teeth 5, 6 tightly together.

When the transmission is used to start a turbine, and the driven coupling member attains a predetermined speed, the arms 18 of spider 17 move outwardly and straighten up by centrifugal force as indicated in dotted lines in Fig. 2, thereby compressing the spring 16. The driving torque transmitted through the overrunning clutch, however, holds the teeth 5, 6 in engagement. When the turbine becomes self-operative, the relief of the load permits spring 15 to disengage the clutch teeth 5, 6 and hold them out of engagement thereafter as long as the coupling member 9 rotates above the critical speed.

In Fig. 4 of the drawing there is illustrated a second embodiment of the invention incorporating a driving shaft 41 on which a driving clutch member 42 is fixedly mounted by means of a pin 43. An intermediate clutch and coupling member 44 is journalled on a stub shaft 45 mounted in a counterbore 46 in a driven coupling member 47. Clutch member 42 has teeth 48 cooperating with the teeth 49 of the intermediate member 44, and the latter has inclined teeth 51 cooperating with similar teeth 52 on the driven coupling member 47. A spring 53 between the intermediate member 44 and the driven coupling member 47 normally keeps the clutch teeth 48, 49 in engagement.

A plurality of clutch-opening springs 54 are seated in the body of the intermediate member 44 and bear against a thrust washer 55 which is slidably mounted on the stub shaft 45. A plurality of arcuate weight members 56 are arranged about the stub shaft 45 in contact with the thrust washer 55 and are normally confined in engagement with the stub shaft by means of a dished thrust ring member 57 retained on the end of the stub shaft 45 by a lock ring 58.

Normally the springs 54 are compressed slightly if at all, and the clutch closing spring 53 is effective to maintain the clutch teeth 48, 49 in mesh as illustrated. When however the driven coupling member 47 rotates above a predetermined speed, the weight members 56 move outwardly, compressing the clutch releasing springs 54 by reason of the dished formation of the thrust ring 57. As long as the power shaft 41 continues to drive the coupling member 47, the inclination of the coupling teeth 51, 52 holds the overrunning clutch members together in spite of the compression of the springs 54 by the weight members 56. As soon as the driven coupling member 47 overruns the power shaft however, releasing the load on the coupling teeth, the springs 54 are immediately effective to compress the spring 53 and hold the overrunning clutch teeth 48, 49 out of engagement as long as the driven member is rotated above the speed necessary to hold the weight members 56 in their outer positions.

Although but two embodiments of the invention have been shown and described in detail it will be understood that other embodiments are possible and that changes may be made in the design and arrangement of the parts without departing from the spirit of the invention.

I claim:

1. In a self-tightening overrunning clutch connection a power shaft, a dental type driving overrunning clutch member fixed thereon, an intermediate clutch and coupling member cooperating with the driving clutch member, a second coupling member driven by the intermediate member, spring means normally pressing the overrunning clutch members together, a second spring means tending to separate said clutch members and centrifugal means mounted to rotate with the driven coupling member operating with said second spring means to overcome the first spring means and cause the second spring means to move and hold the clutch members apart as long as the driven coupling member rotates above a predetermined speed.

2. An overrunning clutch connection as set forth in claim 1 in which said coupling members are provided with cooperating inclined driving projections operative to wedge the coupling members apart when under load.

3. An overrunning clutch connection as set forth in claim 2 including further means including a barrel member surrounding the clutch and coupling members and limiting their separation.

4. An overrunning clutch connection as set forth in claim 1 in which the driven coupling member is formed with an axial counterbore, and including further a stub shaft mounted in said counterbore serving as a support for said intermediate member and said spring means.

5. An overrunning clutch connection as set forth in claim 1 including further means for adjusting the said first spring means to select the speed at which the centrifugal means becomes operative.

6. An overrunning clutch connection as set forth in claim 5 in which said first spring means is located between the coupling members, and said adjusting means comprises a thrust ring forming an abutment for said first spring means, and means for adjustably spacing said thrust ring from the driven coupling member.

References Cited in the file of this patent

UNITED STATES PATENTS

| | | |
|---|---|---|
| 2,535,017 | Miller | Dec. 19, 1950 |
| 2,538,300 | Digby | Jan. 16, 1951 |
| 2,554,445 | Miller | May 22, 1951 |